Feb. 12, 1952 D. R. P. JACKSON 2,585,554
STACKING DEVICE FOR WORKPIECES OF RECTANGULAR BLOCK SHAPE
Filed June 29, 1948 5 Sheets-Sheet 1

INVENTOR
D. R. P. Jackson
By Watson, Cole, Grindle & Watson

Feb. 12, 1952 D. R. P. JACKSON 2,585,554
STACKING DEVICE FOR WORKPIECES OF RECTANGULAR BLOCK SHAPE
Filed June 29, 1948 5 Sheets-Sheet 2

INVENTOR
D. R. P. Jackson
By Watson, Cole, Grindle & Watson

Feb. 12, 1952        D. R. P. JACKSON        2,585,554
STACKING DEVICE FOR WORKPIECES OF RECTANGULAR BLOCK SHAPE
Filed June 29, 1948        5 Sheets-Sheet 3

INVENTOR
D. R. P. Jackson
By Watson, Cole, Grindle & Watson

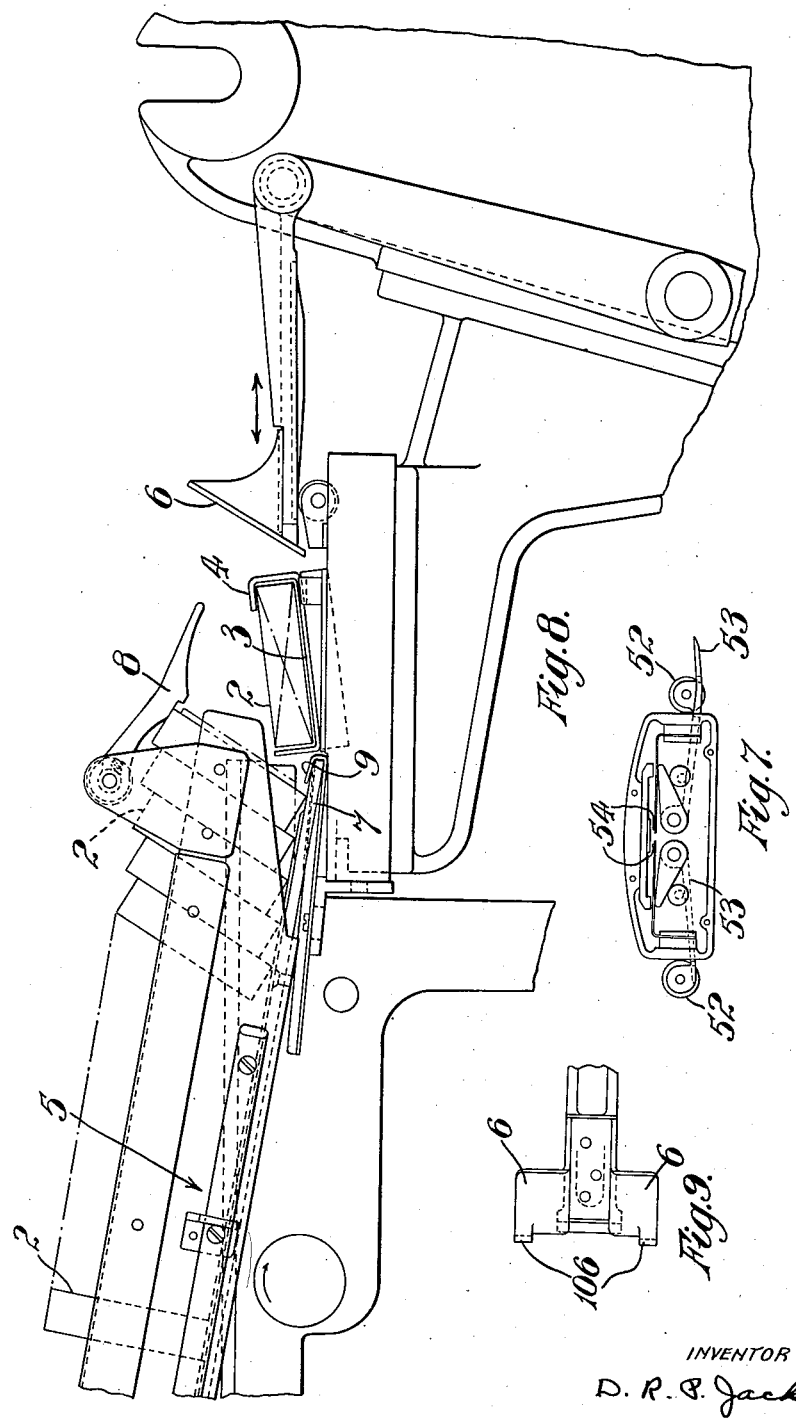

Patented Feb. 12, 1952

2,585,554

UNITED STATES PATENT OFFICE 2,585,554

STACKING DEVICE FOR WORKPIECES OF RECTANGULAR BLOCK SHAPE

Donald Richard Patrick Jackson, London, England, assignor to Molins Machine Company Limited, London, England, a British company Application June 29, 1948, Serial No. 35,788
In Great Britain July 7, 1947

3 Claims. (Cl. 214—6)

This invention concerns improvements in or relating to stacking devices for workpieces of rectangular block shape, and refers more particularly to devices for stacking workpieces such as cigarette cartons of thin rectangular block shape so that they stand on a narrow face with their broad faces parallel to one another. In automatic machines, for instance, packing machines, such workpieces (e. g. cigarette packets) are commonly manipulated while they are supported on a broad face and for convenience and economy in space are often delivered from the machine into a guide or stacker where they stand on a narrow face and more or less vertically. The invention provides improved means for turning the workpieces from the position where they are supported on a broad face to that where they stand on a narrow face.

According to the invention there is provided a device of the kind referred to comprising a pusher having an operative face inclined to the plane on which a workpiece is supported and movable into engagement with said workpiece so that the leading edge of the pusher slides beneath the workpiece and in contact with the lower face thereof whereby the workpiece is tilted through the angle between said operative face and said plane. The value of the angle depends to some extent on the means adopted to move the workpiece through a further angle to make a total movement of 90° such means being described later.

The pusher may be carried on links so operated that the operative face of the pusher, that is, the face which engages the workpiece, itself performs a swinging movement so that after moving beneath the workpiece and tilting it the pusher face swings up and moves the packet correspondingly. Thus in this case the workpiece is first moved through the first angle by the inclination of the pusher, whereafter the movement through the complement of the 90° angle is made by the swinging movement of the wedge on its links. In another construction the pusher has no movement relative to its supporting means and succeeding workpieces move the first said workpiece along a chute or the like whereby the friction between the base of the workpiece and the base of the chute causes the packet to move from the said suitable angle until it stands on a narrow face in said chute.

Means may be provided for lifting the pusher on its return stroke to clear a workpiece which moves beneath the pusher path while the pusher is moving backwards and this means may be of the special construction described herein.

The chute may be displaceable from its normal position and held by a catch in such position.

Means may be provided to hold the pusher in an inoperative position when it is desired that workpieces shall be allowed to pass by the pusher and a detecting device cooperating with said passing workpieces may be arranged to disengage the pusher holding means when it is desired to bring the pusher into operation. A stop which may be mechanically operated may be provided for locating each workpiece in alignment with the chute.

The invention will be more fully described with reference to the accompanying drawings which show its application to a cigarette packing machine in which the final operations on the packet are completed in a rotatable pocket wheel, for example as described in the co-pending application for U. S. Letters Patent, Serial No. 677,228.

In the drawings:

Figures 1 and 2 together show a side elevation of part of a packing machine constructed according to the invention.

Figures 3 and 4 together show a plan of Figures 1 and 2.

Figure 5 is an end view of a chute shown in Figure 2 looking in the direction of the arrow (Figure 1).

Figure 6 is a detail of a modification to Figure 2.

Figure 7 is a view of a switch shown in Figure 4, looking in the direction of the arrow B (Figure 4), the cover being removed.

Figure 8 is a view of a fragment of Figure 2 showing a modification.

Figure 9 is a plan of a pusher shown in Figure 8.

Figure 2:
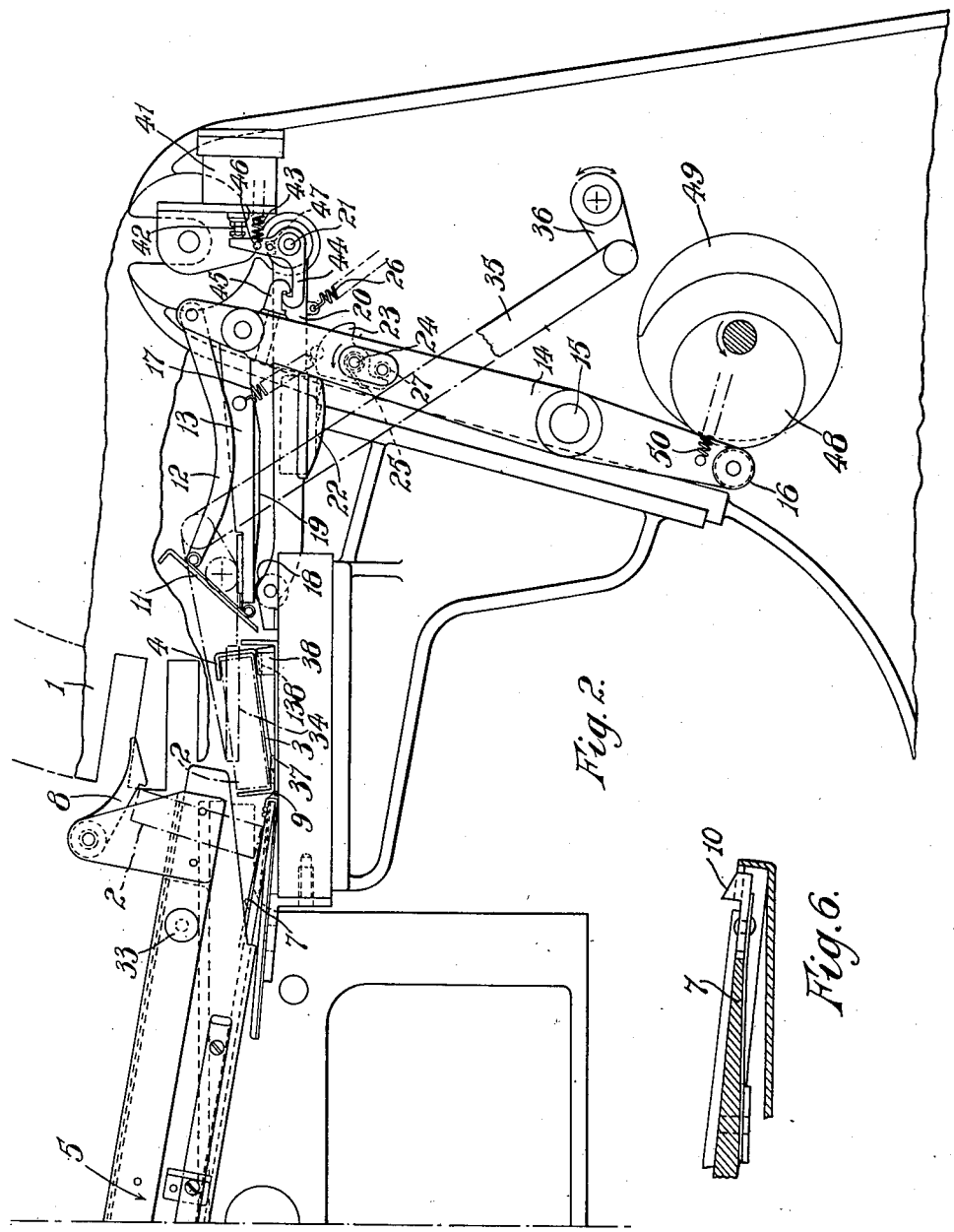
Figure 3:
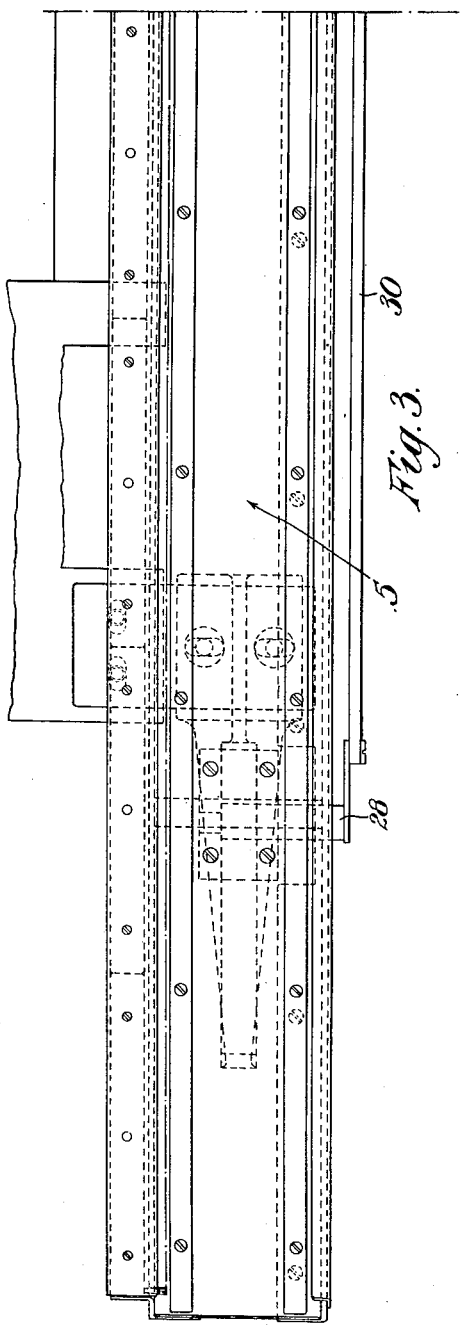
Figure 4:
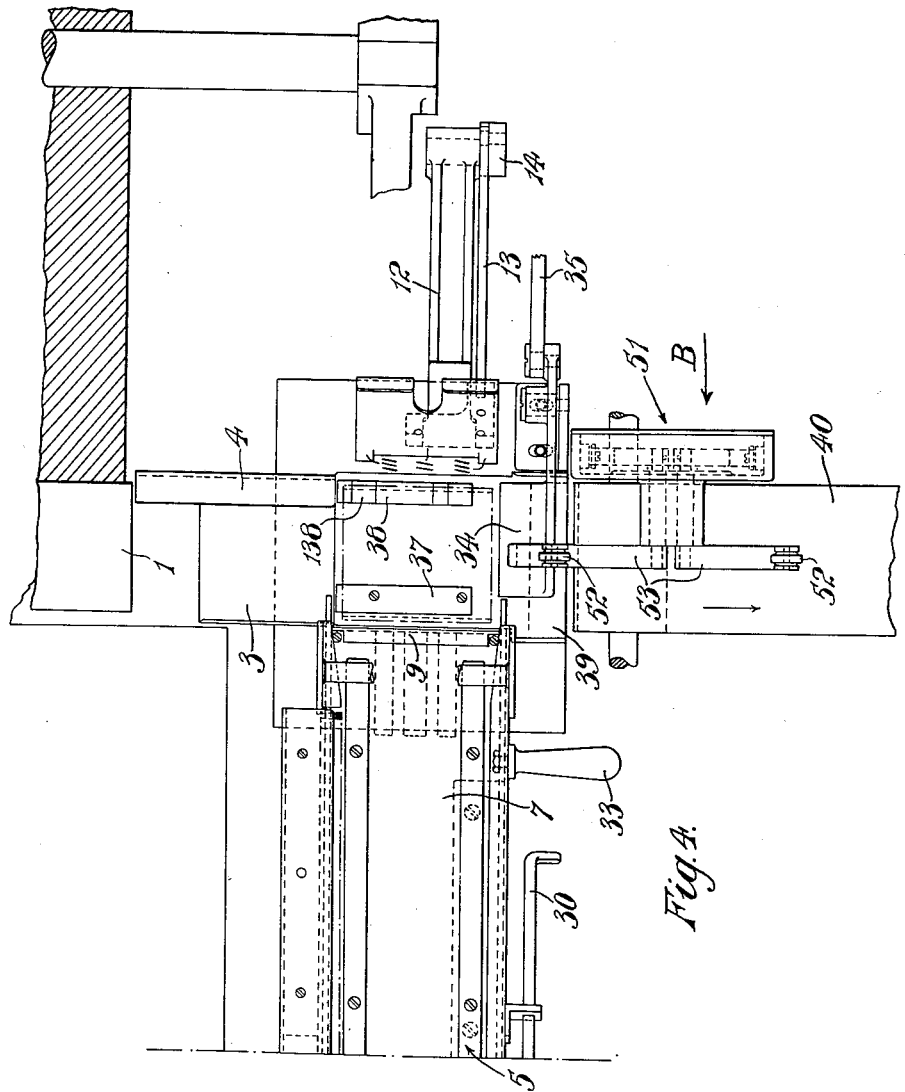

Referring to Figures 2 and 4 of the drawings, a part of the rotatable pocket wheel described in the above-mentioned specification is shown and marked I. The wheel and its associated mechanism are described and illustrated fully in said specification and it is only necessary to repeat here that packets 2 are ejected from the wheel I at a position slightly inclined to the horizontal and resting on their broad faces, that is, a packet enters the wheel in a horizontal position and after rotating with it for nearly a revolution the packet is discharged therefrom one pocket pitch below said horizontal position. The packets are discharged laterally from the wheel on to a plate 3 whose upper surface is parallel to the lower broad face of the packet. The plate is bent as best seen in Figure 2 to a channel form with an overhanging part 4 so that the packets are fully guided and controlled.

It will be seen that with this construction, succeeding packets would push the preceding ones continually along said surface of plate 3, that is, in a direction parallel to the wheel axis. It is however desired to stack the packets in a "chute" which extends transversely of the wheel axis and in doing so to turn each packet so that eventually it stands in the chute on a narrow face thus forming a stack of packets standing on their edges with broad faces in contact. The word "chute" is used here as is common in the art to mean a trough with a flat bottom and upturned sides to support and hold the packets.

The chute 5 is displaced from the side of the wheel 1 by slightly more than the length of a packet, see Figure 4. As aforesaid, a packet ejected from the wheel pushes the preceding packet along and when this has occurred twice, the leading packet is in line with the chute.

A packet leaving the surface of plate 3 passes on to two strips 37 and 38 which jointly support the packet in line with the chute and are so shaped that the packet is supported at the same angle and level as on the plate 3. The strip 38 is grooved at 138 to accommodate the lower edge of the pusher which has two lugs, 106 in Figure 9 and 111 in Figure 4, so that the leading end of the pusher is able to move beneath the packet.

A pusher having a wedge-shaped operative end, that is an end having a face inclined to the lower broad face of the packet, is arranged to reciprocate in alignment with the chute and engage each ejected packet in turn and thrust it towards the chute.

Two kinds of pushers are shown in the drawings, one being simply fixed to a reciprocating arm while the other is reciprocated and also turned by two arms pivoted to the pusher as will be described later. The simpler form of pusher which is shown in Figures 8 and 9 will be described first. The pusher 6 is substantially of wedge shape and its operative face is obliquely disposed as shown so that it engages the packet beneath its lower broad face and exerts a kind of wedge action thereon. The above mentioned surface of the plate 3 parallel to the lower broad face of the packet is inclined downwardly at an angle of about 8° to the horizontal. The chute 5 is inclined upwardly at an angle of about 10° to the horizontal and the operative face of the wedge-shaped pusher 6 makes an angle of about 60° with the horizontal or 50° relatively to the base of the chute. As a packet is moved towards the chute its lower leading edge moves into frictional contact with the base 7 of the chute. The resulting friction between the packet and the base of the chute and the pressure of the operative face of the pusher form a couple which rotates the packet on said edge and the pusher slides under the adjacent broad face of the packet so that the packet rests on the operative face thereof. This movement causes the lower trailing edge of the packet to move beneath a spring pressed pawl 8 and the pusher moves back leaving the packet standing on an edge at the aforesaid suitable angle. The edge of the chute base has a thin bent plate 9 fixed to it forming a step over which the packet moves and this step acts in conjunction with the pawl 8 to prevent the packet from being displaced. Two pawls could, however, be used, a pawl 8 as described and a small one 10 as shown in Figure 6 instead of the step 9, the pawls being adapted to engage the upper and lower trailing edges respectively of the packet. The pushing operation is repeated for the succeeding packets and vary soon when several packets are in the chute the friction between the base of the packets and the base of the chute is sufficient to cause all but the last few packets in the chute to close up into a stack all standing on a narrow face with their broad faces at right angles to the base of the chute and neighboring broad faces in contact. The packets begin to reach their proper standing position at about the place shown at the left of Figure 8, where one packet properly disposed is shown.

Referring again to Figures 2 and 4 the other form of pusher consists of a plate 11 pivoted to a pair of operating links 12 and 13. It will be seen that the operative face of the plate 11 is disposed at a considerable angle (50°) to the horizontal, much the same as before, but in this case the arms are operated as described below, after the sloping plate has turned a packet through an angle of about 50°, to cause the packet to complete the 90° movement. This arrangement saves the pressure on the packets which occurs in the arrangement shown in Figures 8 and 9 as a packet at an angle is pushed forwards to move the rest along the chute. As the pressure comes almost entirely on the leading corner of a packet it may be severe enough to distort the packet in some cases.

The mechanism for reciprocating the pushers is substantially the same for both forms of the invention except that means is provided for swinging the pusher plate 11 in the form shown in Figures 2 and 4 and pusher mechanism for this form of the invention will be described in detail.

The pusher links are pivoted to the upper end of a double-armed lever 14 pivoted at 15 to the frame of the machine. The lower end of the lever has a roller 16 on it which engages with a cam.

It will be seen from Figure 2 that as the pusher links 12 and 13 are connected to the lever 14 at different positions the arms, lever and pusher plate form a linkwork which as the lever 14 swings over to the left on the pushing stroke causes the pusher plate to assume a position substantially at right angles to the base 7 of the chute 5. In this case therefore the pusher plate acts first by tilting the packet in the same way as the pusher 6 in Figure 8 and then swings to turn the packet from the angle at which it stands after the tilting action to a position where it is substantially normal to the base of the chute.

As the work entailed in pushing a column of packets along the chute is heavy a closed groove cam may be used in preference to an open cam and spring, or the cam may be of the kind shown in Figure 2 and described later, which is designed for a modified use of the invention. The pusher is urged downwards by a spring 17 which holds the arm, or the lower arm as the case may be, in contact with a roller 18, the underside of the arm comprising a cam 19, which engages with said roller and determines the line of movement of the pusher. The roller 18 is carried near one end of a lever 20 which is pivoted to the frame of the machine at 21.

When, as is usually the case, the packets are discharged from the wheel with such rapidity that they are practically in contact, the pusher is arranged to lift on its return stroke to clear the following packets and means for effecting this lifting is described below.

The lower side of the lever 20 is therefore provided with a cam face 22 adapted to engage a cam follower 23 of special shape which is pivoted at 24 on the double-armed lever 14. The follower is of eccentric contour and provided with a torsion spring 25 which tends to rotate it in the direction of the arrow and into engagement with the cam face 22 on the lever. A spring 26 urges the lever towards the follower. At the beginning of the forward or operative stroke of the pusher the follower rolls on its pivot by tripping against the rear end of the cam face 22 thereby stressing the torsion spring. This turns the follower clockwise so that its eccentric contour becomes inoperative and the pusher is allowed to make an uninterrupted movement forwards at the end of which the follower is freed and twists on its pivot in the opposite direction under the influence of the torsion spring until it meets a stop 27 which prevents a further rotation and during the return movement of the pusher the follower lifts the pusher arm up to the height necessary to clear the packet beneath it.

Figure 1:
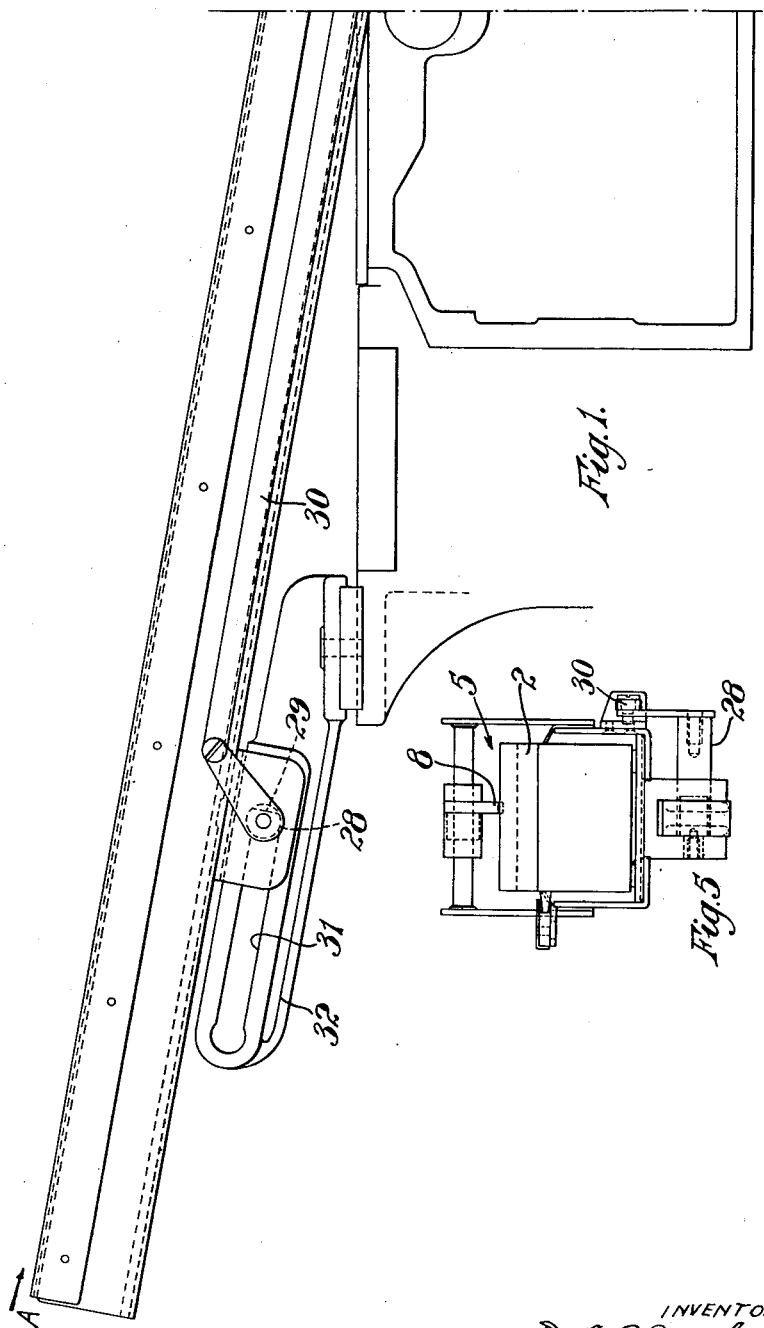

The chute 5 is slidably mounted so that on releasing a latch it can be pushed lengthwise away from the pocket wheel which is convenient when it is desired to inspect the mechanism for adjustment and the like. The latch consists of a round rod 28 having a flat face 29. When a bar 30, Figure 1, is pushed to the left the rod is rotated and it can then slide in a slot 31 in a support bracket 32 and the chute can be moved to the left by a handle 33.

A stop 34 may be provided to arrest the leading packet as the packets are ejected from the wheel and for special purposes this stop may be mechanically operated by a link 35 connected to an oscillating arm 36 as will now be explained.

It is often the practice to couple one machine to another in order that other operations may be performed on the workpieces and in the case being described it is common to couple the machine described to a wrapping machine which encloses each packet in an outer wrapper. In such a case the packets form a column as they are ejected from the wheel and the mechanically operated stop ensures that the packet opposite the chute is properly aligned therewith, in case it should prove necessary to push it into the chute, and then rises to allow the packet to pass on should it prove unnecessary to push it into the chute. The under surface of the stop also acts as a light presser to drop on a packet beneath it and position it on a horizontal surface 39 on to which it moves from the strips 37 and 38. The packets move on to a belt conveyor 40 which takes them to the wrapping mechanism but should the wrapping machine stop, the pusher is brought into operation to deliver further packets from the packing machine into the chute in the following manner.

During the time that the wrapping machine is working the pusher is held from operation by a solenoid 41 whose core 42 is then as shown in Figure 2 so that a spring 43 can hold a pivoted hook 44 against the core as shown so that the hook automatically latches with a hook 45 on the pusher lever 14 when the latter moves to its rear position. If the solenoid is energized its plunger protrudes and turns the pivoted hook 44 so that the pusher lever is released. The movements of the hook 44 are limited in either direction by a pin 46 moving in a slot 47.

The pusher cam employed in this case is a simple disc cam 48 of suitable shape but for part of its periphery it is shrouded with a cam 49 having a face parallel to the contour of the disc cam so that for this part the whole device constitutes a grooved cam while the roller 16 is kept in contact with the remaining periphery of the disc cam by a spring 50 in the usual manner. This enables the pusher to be held back by the hooks 44 and 45 but allows a grooved cam to be employed for the operative stroke, for a spring strong enough to move the pusher and a chute full of packets on the operative stroke would be too strong for convenience. As previously stated, this cam is also suitable for general use with the pusher although it has been designed mainly for use where packets are passed onto a belt instead of always going into the chute.

The solenoid is energized, when the wrapping machine stops, by a detector 51, Figures 4 and 7, comprising two rollers 52 disposed lengthwise of the track of the packets on the conveyor band. The rollers are pivoted on the ends of levers 53 and rise and fall in turn as the packets, which are equally spaced from each other, pass beneath them on the conveyor band. Each lever closes a switch 54, Figure 7, as its roller rises but the two switches are in series and the spacing of the rollers is such that normally when a packet is beneath one roller the other roller is in the down position. When the wrapping machine stops, the packets accumulate on the band, which also stops, and in time the packets abut one another so both rollers are raised at once and the solenoid circuit is completed. The pusher catch 44—45 is thus released and the pusher forms a stack of packets in the chute until the wrapping machine is restarted when, as soon as the abutting packets are cleared, the solenoid circuit is broken again. The pusher is then held by the catch 44—45 and the packets in the chute may be held as a reserve should the packing machine stop while the wrapping machine is still working or they may be removed from the chute if convenient.

What I claim as my invention and desire to secure by Letters Patent is:

1. In apparatus for feeding rectangular workpieces, the combination with a plate having a surface for receiving and supporting a workpiece, of a pusher having an operative face inclined with respect to said surface, an oscillating lever, spaced links pivoted to said lever at points spaced radially of the pivotal axis of the latter, and to said pusher, whereby said pusher is moved through a predetermined path toward said plate and is concurrently tilted to alter its angular relation to said plate on oscillation of said lever, said plate being so positioned adjacent the path of movement of said pusher that the latter slides beneath the workpiece with the operative face of the pusher inclined at an obtuse angle to said workpiece so as to engage a lower edge of said workpiece and tilt the workpiece upwardly into the plane of the operative face of the pusher, said links being thereafter effective to tilt said pusher and the engaged workpiece, whereby said workpiece is tilted through a total angle of at least about 90°.

2. A device as claimed in claim 1, wherein workpieces are moved onto said plate in a direction at right angles to the pusher path comprising means for lifting the pusher on its return stroke to clear a workpiece moving onto said plate.

3. A device as claimed in claim 1, wherein workpieces move onto said plate in a direction at right angles to the pusher path comprising means for holding the pusher in an inoperative position when it is desired to allow workpieces to pass by the pusher, and a detecting device cooperating with said passing workpieces and adapted on operation to release the pusher holding means whereby the pusher is again brought into operation.

DONALD RICHARD PATRICK JACKSON.

REFERENCES CITED

The following references are of record in the file of this patent:

UNITED STATES PATENTS

| Number | Name | Date |
|---|---|---|
| 663,627 | Herbert, Jr. | Dec. 11, 1900 |
| 1,279,562 | Lowell | Sept. 24, 1918 |
| 1,501,285 | Lawrence | July 15, 1924 |
| 1,506,632 | Gruetter | Aug. 26, 1924 |
| 1,635,262 | Donnelly | July 12, 1927 |
| 1,726,418 | Aldrich et al. | Aug. 27, 1929 |
| 1,763,738 | Avis | June 17, 1930 |
| 2,294,841 | Ezell | Sept. 1, 1942 |
| 2,358,413 | Monaco | Sept. 19, 1944 |

FOREIGN PATENTS

| Number | Country | Date |
|---|---|---|
| 29,863 | Netherlands | May 15, 1933 |